US008893130B2

(12) United States Patent
Smith et al.

(10) Patent No.: US 8,893,130 B2
(45) Date of Patent: Nov. 18, 2014

(54) TASK SCHEDULING METHOD AND SYSTEM

(75) Inventors: Gary S. Smith, Castle Rock, CO (US);
Joseph P. White, Castle Rock, CO (US);
Michael J. Stahlberg, Aurora, CO (US);
Christopher B. Koller, Goose Creek, SC (US)

(73) Assignee: Raytheon Company, Waltham, MA (US)

( * ) Notice: Subject to any disclaimer, the term of this patent is extended or adjusted under 35 U.S.C. 154(b) by 2107 days.

(21) Appl. No.: 11/691,361

(22) Filed: Mar. 26, 2007

(65) Prior Publication Data

US 2008/0244584 A1 Oct. 2, 2008

(51) Int. Cl.
*G06F 9/46* (2006.01)
*G06F 9/48* (2006.01)
*G06Q 10/06* (2012.01)

(52) U.S. Cl.
CPC .............. *G06F 9/4881* (2013.01); *G06Q 10/06* (2013.01)
USPC ....................................................... 718/102

(58) Field of Classification Search
None
See application file for complete search history.

(56) References Cited

U.S. PATENT DOCUMENTS

| 5,311,423 | A |   | 5/1994  | Clark |         |
|-----------|---|---|---------|---------------|---------|
| 5,325,526 | A | * | 6/1994  | Cameron et al. | 718/102 |
| 5,394,547 | A | * | 2/1995  | Correnti et al. | 717/175 |
| 6,035,278 | A |   | 3/2000  | Mansour |         |
| 6,490,566 | B1 |   | 12/2002 | Schmidt |         |
| 6,584,400 | B2 |   | 6/2003  | Beardsworth |     |
| 6,594,637 | B1 |   | 7/2003  | Furukawa et al. |  |
| 6,687,678 | B1 |   | 2/2004  | Yorimatsu et al. | |
| 6,704,765 | B1 | * | 3/2004  | Chang et al. | 718/102 |
| 7,562,364 | B2 | * | 7/2009  | Sanjay | 718/103 |
| 2006/0010448 | A1 | * | 1/2006 | Sathe | 718/102 |
| 2007/0180451 | A1 | * | 8/2007 | Ryan et al. | 718/104 |

FOREIGN PATENT DOCUMENTS

WO    WO 00/55732    *  9/2000

* cited by examiner

*Primary Examiner* — Gregory A Kessler
(74) *Attorney, Agent, or Firm* — Schwegman Lundberg & Woessner, P.A.

(57) ABSTRACT

Provided is a method for scheduling activities. The method includes partitioning tasks provided for scheduling. The partitioning is accomplished by receiving at least one task including at least one data type. The data type is reviewed to determine at least one scheduling criteria and the task is routed to a queue based on the determined scheduling criteria. Each queue also has at least one queue characteristic. The method also includes scheduling the partitioned tasks. The scheduling is accomplished by retrieving the at least one task from the queue in response to a trigger. The retrieved task is routed to at least one scheduler. In a first instance the routing is based on the queue characteristic. In a second instance the routing is based on at least one scheduler characteristic. A scheduling system for performing this method is also provided.

25 Claims, 6 Drawing Sheets

TASK SCHEDULING METHOD AND SYSTEM

FIELD

This invention relates generally to the scheduling of new activities in a schedule, and, in particular, to a system which permits insertion, deletion, and modification of activities rated by priority without removing higher priority activities, wherein the collection of items to schedule is decomposed into subsets of items based on some criteria.

BACKGROUND

Simply stated, a schedule informs a party of what activity/activities are to take place, when the activity/activities will take place, and who will perform the activity/activities. A schedule may run for an hour, day, week, month, or other interval of time. Generally, the "when" quality is a specific reference to start an activity at a specific time and/or end that activity at a later specific time.

With respect to the "what" quality, a schedule may provide very generic activity information such as sleeping, eating, building, or some other activity. The "what" quality may also provide resource information—sleeping in bed 2, eating at table 5, or building at station 4.

With respect to the "who" quality—a schedule may provide information to observers of an activity regarding who is performing the activity, or the schedule may provide direction to a party to commence with or finish an activity. Typically, a schedule will also indicate free time, as in unscheduled time, as well as the busy time, as in time currently scheduled for activities.

A schedule may be assembled by scheduling activities in the order in which they are received, or in which they logically occur. A schedule may also be assembled by prioritizing activities in descending or ascending order of preference. Where the time that an activity is to occur or might occur is important, the focus of placement may shift from simple order of preference to level of priority at a specified time.

In many real world settings there are specific demands upon schedules. For any given resources (such as an aircraft, a satellite or a computer) there may be a finite availability both in terms of how long something may occur and how much may occur. Computer speeds are continuing to increase, but for each second of time a computer (CPU) has a finite number of operations to perform. A more powerful CPU resource may indeed execute more operations than a less powerful CPU resource, and such an option may or may not be taken into account when forming a schedule. In another example, an aircraft or satellite may not be over a particular spot on the earth at all times, and even when over a target area, may only be able to observe, deploy, gather, or perform a finite number of activities before returning to base or passing out of range.

To fill a schedule with activities competing for time slots, or to enter new activities into an existing schedule where the new activities compete with existing scheduled activities is far from easy. Many problems, and the algorithms that may be applied to them, are linear—double or triple the input and they will take twice or three times as long to complete. Others may be quadratic, cubic or another polynomial. When a class of problems is encountered where the solution is not polynomial, it may well be a nondeterministic polynomial—more commonly referred to as "NP-hard".

Filling a schedule and inserting new activities into a schedule are activities that qualify as NP-hard. NP-hard problems are well known and frequently encountered, yet no algorithm to solve them to optimality in polynomial time is known. A fast algorithm is one that will return the best solution quickly enough for the solution to actually be useful. If the solution takes years to compute, it is quite likely that the term of usefulness will have long expired.

A famous example of such an NP-hard problem is the Traveling Salesman. A salesman desires to visit each state capital and wants to minimize his or her driving time. Within the 50 states there are 49! possible choices—and no algorithm is known to exist that will solve this problem in a reasonable amount of time.

For a schedule, it may be that, given an infinite amount of time, a best solution may be found. However, during the instantiation of a schedule, and the subsequent modification of a schedule, real time continues to progress. As a result, by the time a best solution has been found, it is entirely possible that too much time will have passed and the issue will be moot.

In many instances, scheduling algorithms are designed on a case by case basis to address what is perceived as a specific scheduling need. Although effective, this can lead to significant inefficiency as many scheduling systems may utilize similar if not identical operations. In addition, if an issue of priority effecting one or more tasks changes suddenly due to a real world crisis, a customized algorithm may be unable to favorably adapt.

Indeed there are many different types of scheduling methodologies, and even for the same type of event scheduling, different methodologies may be more or less favored at different times.

Where the desire is to schedule the maximum number of activities, regardless of priority, an English Auction may be quite effective. However, if there is a premium placed on the scheduling of higher priority activities, then an English Auction may not offer the best solution. Indeed, if the mandate is to schedule as many events as possible, but no higher priority activity may ever be usurped by one or more lower priorities, then the English Auction approach will not be acceptable. And again, though an English Auction method may be appropriate for some tasks in a scheduling problem it may not be the most desirable method for all tasks in the scheduling problem.

Mixed Integer methods have also been proposed to provide schedule modification. In a Mixed Integer method, however, each and every allowable possible permutation of activities is considered and evaluated. Even with the speed of modern computers, the focus upon trying all permutations for comparison makes Mixed Integer methods vastly impractical for large scale scheduling problems, but may be ideal for small, time insensitive problems.

Further a system designed to effectively process on-demand tasking may not be ideal for scheduling and rescheduling a list of standing or repeated tasks known to occur at some point beyond the immediate here and now.

Hence, there is a need for a task scheduling method that overcomes one or more of the technical problems found in existing scheduling systems.

SUMMARY

This invention provides a method for scheduling activities.

In particular, and by way of example only, according to one embodiment of the present invention, a method is provided for scheduling tasks including: partitioning tasks provided for scheduling, the partitioning including; receiving at least one task including at least one type of data; reviewing the data to determine at least one scheduling criteria; and routing the task to a queue based on the determined scheduling criteria, the queue having at least one queue characteristic. The method further includes scheduling the partitioned tasks, the scheduling including; retrieving the at least one task from the queue in response to a trigger; and routing the at least one task to a scheduler, the scheduler routing being based in a first instance upon the at least one queue characteristic, and in a second instance upon the at least one scheduler characteristic.

In yet another embodiment, provided is a scheduling system including: a queue router operable to receive a task having at least one type of data, the queue router reviewing the data to determine at least one scheduling criteria and routing the task to a queue based upon the determined scheduling criteria; a queue operable to receive the task from the queue router and provide the task to a schedule manager, the queue having at least one characteristic; a schedule manager operable to retrieve the task from the queue and provide the task to a scheduler; a scheduler having at least one characteristic, the scheduler operable to receive the task from the schedule manager; and a trigger operable to trigger the schedule manager to retrieve the task from the queue.

In yet still another embodiment, provided is a computer-readable medium on which is stored a computer program for scheduling tasks, the computer program including instructions which, when executed by a computer, perform the steps of: partitioning tasks provided for scheduling, the partitioning including; receiving at least one task including at least one type of data; reviewing the data to determine at least one scheduling criteria; routing the task to a queue based on the determined scheduling criteria, the queue having at least one queue characteristic; scheduling the partitioned tasks, the scheduling including; retrieving the at least one task from the queue in response to a trigger; and routing the at least one task to a scheduler, the scheduler routing being based in a first instance upon the at least one queue characteristic, and in a second instance upon the at least one scheduler characteristic.

DETAILED DESCRIPTION

Before proceeding with the detailed description, it is to be appreciated that the present teaching is by way of example only, not by limitation. The concepts herein are not limited to use or application with a specific type of scheduler. Thus, although the instrumentalities described herein are for the convenience of explanation, shown and described with respect to exemplary embodiments, it will be appreciated that the principles herein may be applied equally in other types of scheduling systems.

Figure 1:
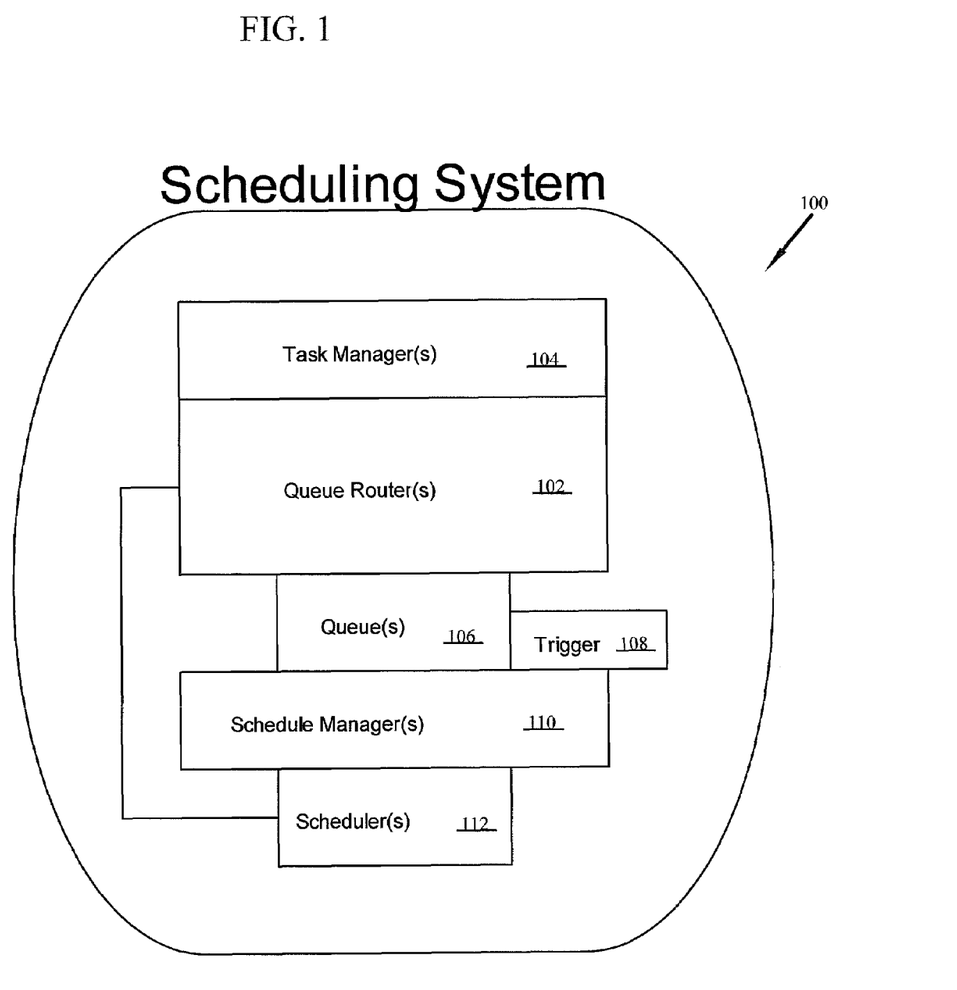
FIG. 1 illustrates a high level block diagram of a scheduling system in accordance with an embodiment.

FIG. 1 is a high level block diagram of the computer program architecture of a scheduling system 100 in accordance with at least one embodiment. Scheduling system 100 may be implemented on a computer having typical computer components, such as a processor, memory, storage devices, and input and output devices. During operation, scheduling system 100 may be maintained in active memory for enhanced speed and efficiency. In addition, in at least one embodiment, scheduling system 100 may be operated on a computer network and may utilize distributed resources.

Scheduling system 100 is a dynamic scheduler that provides a configurable and distributed scheduling framework design to enable automated resource scheduling, plug-n-play algorithms, appropriate partitioning of scheduling requests, and high runtime performance. Scheduling system 100 is designed to meet high volume and high rate demands of tasking input while balancing standing and on-demand tasking requests. This is in part accomplished by supporting multiple and varied scheduling algorithms that run concurrently so as to take advantage of fast impact algorithms for near-real time tasks and slower near-optimal algorithms for long term tasks.

To further assist in the following description, the following defined terms are provided.

"Designated Priority"—A numeric priority valuation of the activity (Priority 1 Activity>Priority 2 Activity).

"Life Span"—The Execution Time required for the activity, which many have a minimum value and a maximum value.

"Implementation Time"—The specific time at which the activity will commence execution.

"Geographic Location"—The geographic location where the scheduled activity will be performed or targeted towards.

"Complexity Level"—A numeric valuation of the complexity of the activity (Complexity 1 Activity>Complexity 2 Activity).

"Scheduling Time Budget"—The amount of time allocated to attempt insertion of the activity within the schedule.

"Precedence Indicator"—A numeric valuation of the precedence of an activity (Precedence 1 Activity must occur before a Precedence 2 Activity).

"Separator"—A time value indicating an interval that must occur between a first activity and a second activity.

Typically one or more of each of these data types is utilized by an actual scheduling algorithm. As is further described below, each of these data types can advantageously be used to queue homogeneous tasks together and to enhance selection of one or more scheduling algorithms so as to advantageously improve the throughput and overall schedule producing ability of scheduling system 100.

With respect to FIG. 1, in at least one embodiment scheduling system 100 includes several specific routines, specifically a queue router 102, a task manager 104, at least one queue 106, a trigger 108, at least one schedule manager 110 and at least one scheduler 112.

The task manager 104 is operable to accept a schedulable task from users of the other components of the system. The task manager 104, though shown as a separate element may in at least one embodiment be a combined component of the queue router 102.

The queue router 102 is operable to receive a task having at least one type of data. This data may be selected from the group consisting of a designated Priority, a Life Span, a preferred Implementation Time, a Geographic Location, a Complexity level, a Resource Requirement, a Scheduling Time Budget, a Precedence Indicator, a Separator, and combinations thereof.

In at least one embodiment, it is these different forms of data which are generally translated by the task manager 104, such as for example a preferred Implementation time of 6:00 PM Mountain Standard Time may be reformatted to 01:00 GMT. Data information may also be converted in form, such as from an integer to a floating point value or an 8-bit value to a 32-bit value. Metadata associated with the data may also be adjusted so as to conform to the expectations of various components comprising scheduling system 100. Specifically, the task manager 104 insures that the task data is in the proper and expected compliant form for each of the schedulers 112 that are associated with scheduling system 100.

The queue router 102 reviews the data to determine at least one scheduling criteria routes the task to a queue based upon the determined scheduling criteria. Each queue 106 is operable to receive the task from the queue router 102 and provide the task to a schedule manager 110. Each queue 106 also has at least one characteristic.

Moreover, each queue 106 has a configurable Queue Content Description (QCD) that describes the types of tasks that the queue is likely to contain. For example, a first queue may have a QCD indicating tasks to be scheduled in the next two minutes, e.g. near real time, and a second queue may have a QCD indicating tasks within the north-west quadrant of an area of interest, e.g. geographic location. Where the determined scheduling criteria is a geographic area, and specifically the north-west quadrant, the task will be directed to the second queue rather than the first queue. A third queue may have a QCD with a logical operator that admits tasks due within one hour and are targeted for the south-east quadrant of a geographical area of interest.

The schedule manager 110 is operable to receive the task from the queue 106 and provide the task to a scheduler 112. In at least one embodiment, the scheduling system 100 includes a plurality of different schedulers 112, each scheduler 112 having at least one characteristic. Retrieval of the tasks from the queue 106 is in at least one embodiment based upon a trigger 108. The trigger 108 may be the passage of time, an accumulation of a specific quantity of tasks in the queue, a signal from a scheduler that it is available, and/or other indicator or combinations of indicators.

The components of scheduling system 100, e.g., queue router 102, task manager 104, queues 106, schedule manager 110 and schedulers 112 share communication and availability status with the other components to which they are directly connected. When a component initializes, it uses a handshaking mechanism to determine the status of its connections. In at least one embodiment, the communication protocol between components is automatically determined and dispositioned accordingly: object-to-object communication for components within a single process space, versus messaging for network distributed components. Communication between the components in the scheduling system may be either synchronous or asynchronous. In at least one embodiment, components such as schedulers 112 and queues 106 especially, may be dynamically added, removed or adjusted during run time operations by the scheduling system operator.

Figure 2:
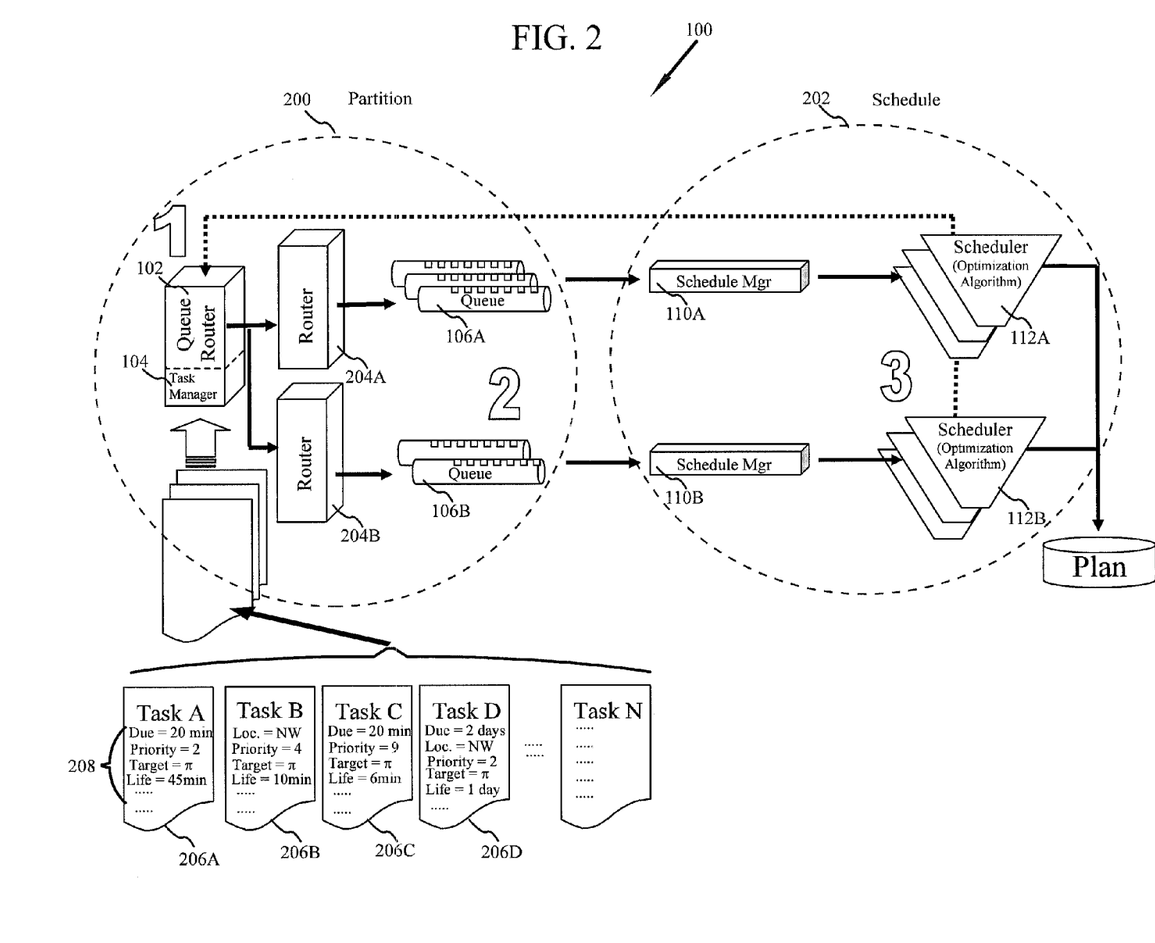
FIG. 2 is a schematic illustration of the scheduling system in accordance with an embodiment.

In simplest essence, scheduling system 100 may be described as a dynamic and adaptable scheduling system as shown in FIG. 2, operating to partition tasks 200 provided for scheduling and schedule 202 the partitioned tasks. Scheduling system 100 operates to 1) partition a scheduling problem into sub-problems by partitioning the tasks, 2) queue the partitioned tasks at the sub-problem level, and 3) apply an appropriate optimization algorithm for the scheduling of the partitioned queued tasks.

In other words, scheduling system 100 is operable to receive tasks for scheduling and dynamically allocate them and partition them to different queues based on at least one scheduling criteria. The queued tasks are then directed to an appropriate scheduler for scheduling, the scheduler selected in a first instance based upon at least one queue characteristic and in a second instance based upon at least one scheduler characteristic. Scheduling system 100 may be employed to insert activities into an empty schedule, thus creating a new schedule, or to insert activities into a pre-existing schedule.

In at least one embodiment, the partitioning 200 is performed by at least one queue router 102 which may have as a separate or integrated component at least one task manager 104, and at least one queue 106. As shown, in at least one embodiment, sub-routers 204 may also be provided to further assist in the proper routing of the partitioned tasks. The scheduling 202 is performed by at least one schedule manager 110 and at least As is suggested by FIG. 2, multiple instantiations of the queue router 102, task manager 104, queues 106, schedule managers 110 and schedulers 112 are operable concurrently. Further, it is understood and appreciated that in at least one embodiment the partitioned tasks are scheduled in parallel.

Figure 3:
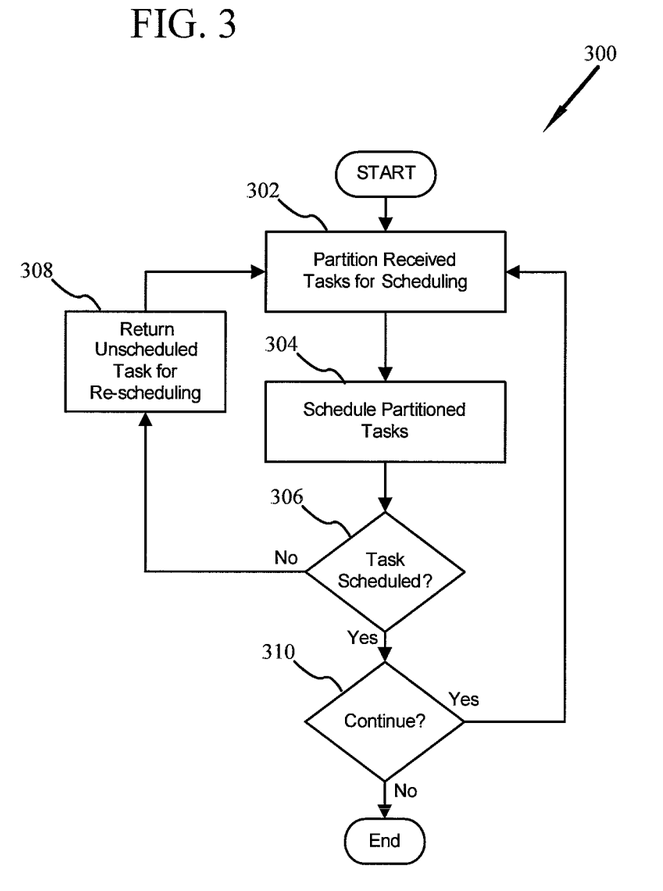
FIG. 3 is a high level flow diagram of the scheduling method in accordance with an embodiment.

FIG. 3 provides a high level flow diagram illustrating the general operation of scheduling system 100 in operation to perform scheduling method 300 in accordance with at least one embodiment. In at least one embodiment, scheduling system 100 receives a new task. The task is reviewed and partitioned for scheduling, block 302. Partitioned tasks, sharing at least one common characteristic are then scheduled, block 304. Should a task fail to schedule, decision 306, it is returned for rescheduling, block 308. If the task has scheduled, scheduling system 100 checks to see if more tasks have been received which require integration into the developing schedule, and thus it should continue operation, decision 310. If there are no further tasks to be scheduled, decision 310, then the system will go idle and wait for new tasks or a command to shutdown. Moreover, scheduling system 100 is employing a divide and conquer methodology to simplify the overall task of generating a comprehensive schedule into the more manageable challenge of scheduling groupings of homogeneous tasks.

Figure 4:
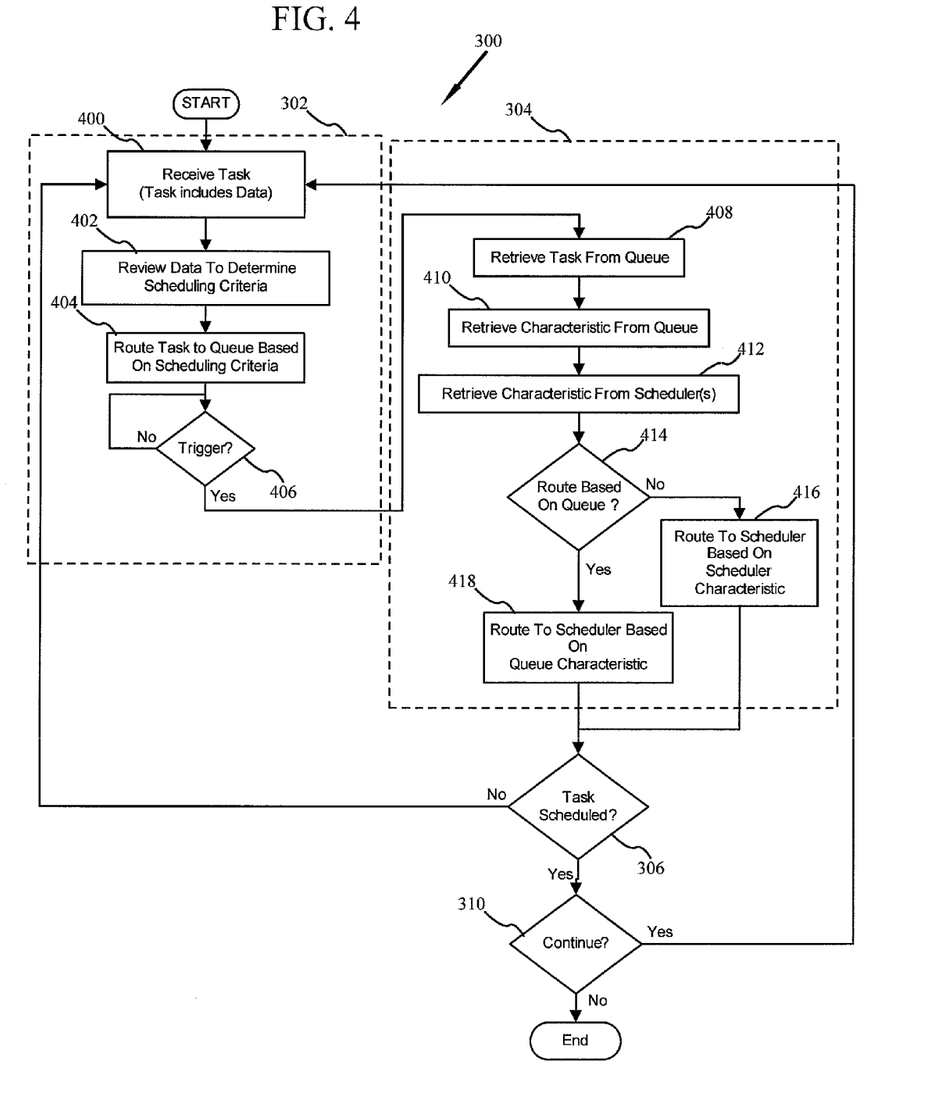
FIG. 4 is a refined flow diagram of the scheduling method in accordance with an embodiment.

The flow diagram of FIG. 4 in connection with FIG. 2 provides a more detailed accounting of scheduling system 100 in operation. It is to be understood and appreciated that the method need not be performed in the precise order herein described, but rather that this order of description is exemplary of at least one embodiment and has been selected for ease of discussion and illustration.

As shown in FIG. 2 there are four tasks 206A~206D received by scheduling system 100, block 400. As stated above, each task has at least one type of data 208 such as but not exclusively limited to a designated Priority, a Life Span, a preferred Implementation Time, a Geographic Location, a Complexity level, a Resource Requirement, a Scheduling Time Budget, a Precedence Indicator, a Separator, and combinations thereof. As shown in FIG. 2, different tasks may have different types of data.

Scheduling system 100, and more specifically the queue router 102 receives the tasks from the task manager 104 which has acted to conform them if necessary. The queue router 102 reviews each task to determine at least one data element for scheduling criteria, block 404. This criteria is user configurable. In the example at hand, the scheduling criteria are prioritized as Implementation Time first and Geographic Location second.

The scheduling criteria is conformed to the configurable QCD that defines the type of task data characteristics for each queue 106. Based on the determined scheduling criteria and the QCD, the queue router 102 will direct each task to an appropriate queue 106, block 404. In at least one embodiment there may be a hierarchy of routers, e.g. routers 204A, 204B, and the routers may employ Boolean logic to further decompose the tasking problem and direct tasks to queues having very specific QCDs, or logical combinations of QCDs.

With respect to the example tasks 206A~206D it is noted that tasks 206A and 206C both state "Due=20 min" indicating an Implementation Time that must occur within the next 20 minutes. Task 206B does not indicate an Implementation Time, and Task 206D indicates an Implementation Time of 2 days. Further, Tasks 206B and 206D both state "Loc.=NW" indicating a Geographic Location of North West Area 1, whereas Tasks 206A and 206C indicate no Geographic Location.

Partitioning of the tasks 206 is therefore possible on the basis of both urgency for Implementation Time and Geographic Location. Based on Implementation Time, Tasks 206A and 206C are sent to queue 106A. Based on Geographic Location, Tasks 206B and 206D are sent to queue 106B.

The use of a queue, and specifically a plurality of queues each with a different QCD, or combination of QCDs, is to permit logical segregation of tasks to be held for the schedule manager(s) 110 to draw from as scheduler's 112 are available Each queue is designed and implanted so as to be highly configurable. In at least one embodiment, each queue 106 is operable to perform a priori modeling and problem constraint checking when and where possible so as to remove these issues from actual scheduler's 112. An alternate embodiment allows each queue to perform ad hoc modeling, constraint checking, and scheduling, interrupting currently running schedulers if necessary.

Queues 106 may also be configured to internally prioritize tasks based on resource availability, Designated Priority, Life Span, Geographic Location, Complexity Level, Scheduling Time Budget, Precedence Indicator, Separator, FIFO, LIFO, or other factors and combinations thereof. In at least one embodiment, the queues 106 are configured to prioritize queued tasks on the basis of Priority. For example queue 106A will prioritize task 206A, having "Priority=2" ahead of task 206C having "Priority=9". Similarly, queue 106B will prioritize task 206D having "Priority=2" ahead of task 206B having "Priority=4".

In at least one embodiment, delivery of queued tasks from the queue 106 to the schedule manager 110 is a trigger based operation. The trigger may be the passage of an interval of time, the accumulation of a threshold number of tasks, the receipt of a task with a threshold level of priority, an indication of a scheduler being idle, an operator's directive, or other definable element. Moreover, in at least one embodiment, the trigger is a passage of time.

As indicated by decision 406, the partitioning component of scheduling system 100 will continue until such time as a trigger occurs indicating that it is time to move forward with active scheduling. In addition, the behavior of the queue(s) 106 may be active, passive, or even a combination of both in how tasks are provided to the schedule manager(s) 110. Indeed, in one embodiment, upon the event of a trigger the queue(s) 106 will actively deliver the queued tasks to the schedule manager 110, e.g., the queues push the tasks In at least one alternative embodiment, the trigger is registered by the schedule manager 110 which then actively pulls the queued tasks from the queue 106.

By queuing homogeneous tasks together and then attempting to schedule them together, scheduling system 100 advantageously conserves resources. Given a set of tasks, there are of course multiple ways to create a valid schedule for the order that the tasks are executed. With the example of a surveillance satellite or aircraft, it is typically desired to create a schedule that maximizes the use of the instruments on the vehicles while minimizing the costs incurred by performing the task.

Figure 5:
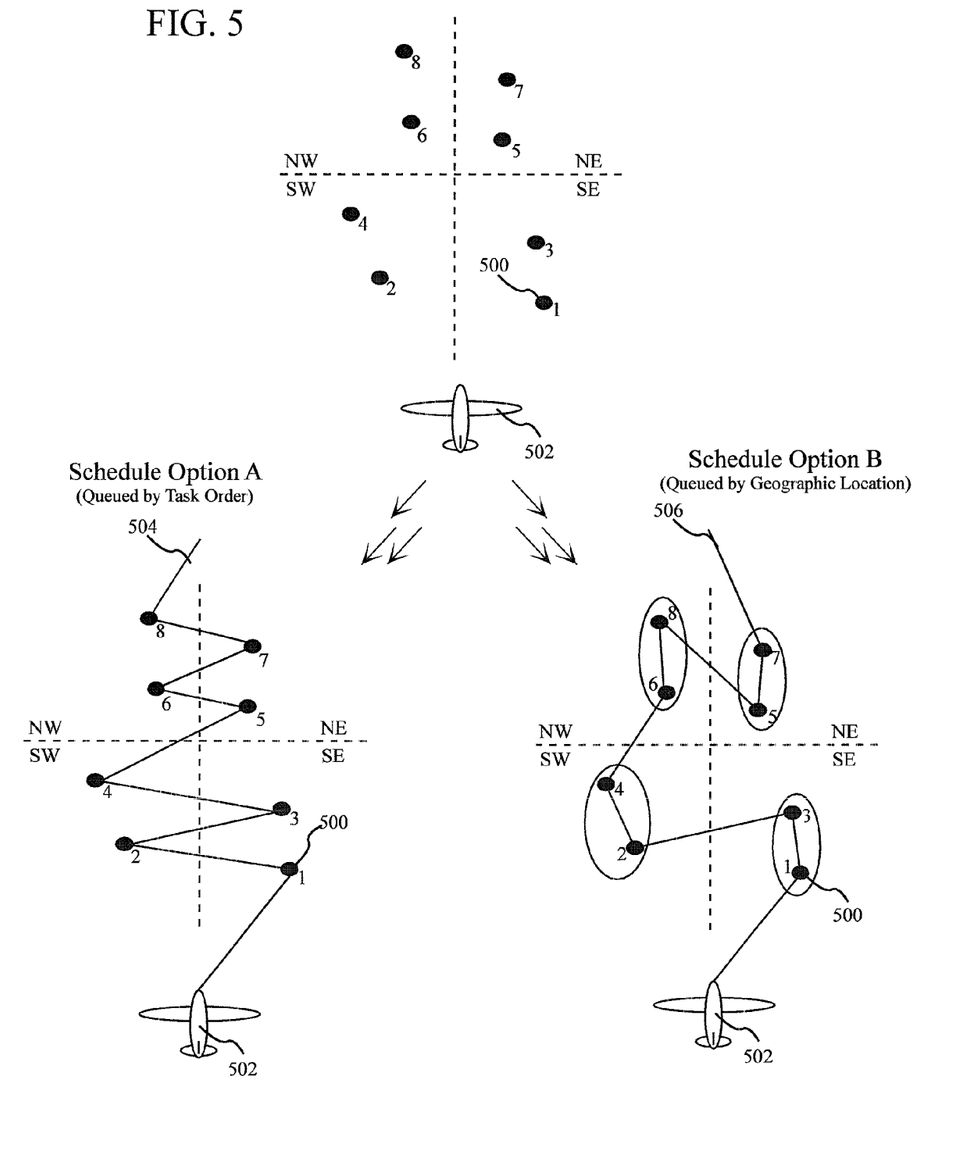
FIG. 5 illustrates different scheduling strategy outcomes in accordance with at least one embodiment.

FIG. 5 illustrates this conservation in the scheduling of two different schedules to observe eight different geographic points 500 with observation vehicle 502. Observation vehicle 502 may be a satellite, aircraft, boat, or other suitable vehicle. The observance of each location has been indicated as a separate task, 1-8

As shown by the Schedule Option A, resulting in path 504, if scheduled by queuing in the order of task receipt, the resulting path 504 involves hopping back and forth. Although this may be desired in some instance, in general this is wasteful of the observation resource 502. Moreover, if the observation vehicle 502 is a satellite, having a finite amount of fuel, it is generally highly preferable to establish a schedule that accommodates as many tasks (e.g., photographs) as possible while reducing the number of times the satellite must As shown by Schedule Option B, resulting in path 506, if scheduled by queuing based on geographic location, the resulting path 506 is less involved. In other words, observations 1 and 3 are queued and scheduled together because both locations are in the SE quadrant. Similarly observations 2 and 4 are queued and scheduled together because they are in the SW quadrant. The same is true for observations 4, 5, 6 and 8 and how they are queued and scheduled.

Moreover, with respect to FIG. 5 it is appreciated that scheduling system 100 can accommodate a wide variety of scheduling issues such as priority and conservation of resources so as to advantageously provide different schedules in accordance with how tasks are queued.

At run time, each schedule manager 110 is operable to determine the queue types and scheduler types to which it is connected. Each schedule manager 110 also maintains a list of ordered gap intervals (blank portions of the overall schedule plan) within the schedule that are worked on by each scheduler 112. Each schedule manager 110 also is responsible for batching tasks for the scheduler to work on and for handling tasks that fail to schedule, such as directing the task back to the queue router 102 for attempted re-scheduling.

As discussed above, each queue 106 has at least one characteristic, e.g. a QCD. Each scheduler 112 also has at least one characteristic. Moreover, schedulers 112 may take many forms. If the scheduling problem presented by the number of tasks is small enough to be solved exactly, (e.g. it is computationally reasonable to solve the problem exactly) an off-the-shelf solver is employed. In at least one embodiment this is an off-the shelf solver utilized to solve mixed integer problem formulations. In an alternative embodiment, this is an off-the-shelf solver utilized to solve a constraint problem formulation.

If the number of tasks to be scheduled, or the tasks themselves are such that an exact solution is not computationally feasible, a variety of different heuristic scheduling methodologies may be employed, such as but not limited to genetic algorithms, hybrid dynamic programming, English auction, greedy impact, squeaky wheel optimization, ant colony, simulated annealing or other scheduling algorithm.

It is understood and appreciated that algorithms such as genetic algorithm, ant colony, simulated annealing, and squeaky wheel all fall under the broader category of meta-heuristics. Meta-heuristics are a group of optimization algorithms typically employed in global optimization problems, especially those in the complexity class of NP. These algorithms generally employ a probabilistic search strategy, and are modeled after natural phenomena. These sorts of algorithms are well understood, however the following brief descriptions are provided so as to further the general understanding of applicant's advantageous scheduling system 100 by all interested parties.

A genetic algorithm models the biological process of chromosomal combinations and mutations. In the scheduling domain, a chromosome represents a schedule. The process seeks to randomly combine the best parts of one schedule with another to produce a better still resulting schedule in the subsequent genetic generation. Mutations alter a single schedule to help keep the genetic pool of schedules sufficiently diverse. The process iteratively generates many generations of new schedules until some threshold or stopping criteria is met.

Ant colony optimization models the feeding behavior of ants. As ants randomly travel to various points searching for food, they leave a pheromone trail. As more ants find and follow the trail the pheromone is strengthened. In the scheduling domain, the points along the path represent different schedule solutions. Each ant can be thought of as an independent agent that searches for a better solution in the scheduling problem domain. Different directions chosen by an ant represent different neighboring solutions to the current schedule solution. As more ants search the space, the best perturbation choices are reinforced through the metaphorical pheromone.

Simulated annealing models the annealing process used to create metal alloys. Certain metals are super-heated and allowed to cool. The rate of cooling affects how the underlying crystalline structure forms. Cooling to quickly results in a brittle structure, and too slowly does not allow the appropriate result to form. In the scheduling domain, a schedule is represented by the molten material. A programmatic cooling curve is used to control the kinetic energy of the schedule. In this sense, kinetic energy is a measure of the likelihood to accept a poor neighboring solution. High kinetic energy implies that undesirable neighboring solutions are more likely to be accepted (diverse search of the space), while low energy only intensifies acceptance of desirable neighboring solutions (directed and uniform search of the space).

Squeaky wheel optimization models the metaphor, "The squeaky wheel gets the oil". The process uses a basic three step procedure. First, the elements to be scheduled are ordered. Second, a schedule is laid out according to the ordering of the first step. Third, an evaluation of the schedule from step two is used to determine so-called "trouble spot" in the evaluated "trouble spots". This cyclic process continues until a stopping criterion is met.

Dynamic programming is a classic optimization technique developed by Richard Bellman. They are used in problems that can be modeled as sequential, multi-stage, interrelated decision problems. There is no single algorithm for dynamic programming; rather it is a modeling and solution technique that adheres to Bellman's Principle of Optimality. Those scheduling problems that can be modeled as path-based or network flow problems are candidates for this technique.

Greedy impact is a task-based heuristic. It uses a myopic strategy of consecutive constraint filtering and problem domain specific prioritization to establish the worth of a task. Tasks are then ordered by worth and scheduled one at a time. If the current task being scheduled impacts an existing task, the existing task can be moved to a free location on the (discrete) schedule. If no free space is available and the current task is of higher worth, the impacted task is simply removed If neither of these conditions is met, then the current task is skipped. This single-pass process is performed once for all tasks to be scheduled.

Indeed, scheduling system 100 can accommodate dynamic change and adjustment of the schedulers in that each is treated as a component module. In at least one embodiment, at least one scheduler 112 is a scheduling method as set forth in U.S. application Ser. No. 11/045,419 filed on Jan. 28, 2005, entitled "Scheduler" by David Fisher and assigned to Raytheon Company, incorporated herein by reference.

It is also understood and appreciated that each scheduler 112 has characteristics, such as for example, slow but very precise, or very fast and wasteful of resources. Each scheduler 112 may therefore be identified by one or more characteristics. More than once scheduler 112 may be appropriate for use in scheduling task from a given queue 106. The choice of which scheduler 112 to employ may be based on a preferential ranking of scheduler 112 characteristics or other factors, such as one scheduler being more or less busy then another scheduler.

As indicated in the flow diagram, the schedule manager 110 retrieves the task(s) from the queue, block 408. The schedule manager 110 also retrieves the characteristic from the retrieval queue, block 410, if that characteristic is not already known to the schedule manager 110. The schedule manager also retrieves characteristics from the schedulers, block 412.

In at least one embodiment, the routing of tasks to a particular scheduler 112 is based on the characteristics of the queue 106, decision 414. For example, if the queue 106 is for near real time tasks, the scheduler 112 selected may be one that is extremely fast in how it adds tasks to the schedule, but not overly efficient in how the schedule is put together (there are gaps of unusable time), or wasteful in how the resources are used (e.g. path 504 in FIG. 5), block 418. At other times, the schedule manager 110 will route to a scheduler 112 based on the characteristics of the scheduler, block 416. Such a scheduler characteristic may include simply the current idle status of the scheduler, the efficiency of the scheduler, or other characteristics and combinations thereof.

As in FIG. 3, should the task fail to schedule, decision 306, such as because a resource is unavailable at the required time, the Implementation Time is unavailable, Priority is not sufficient to overcome blocking activities, or the Scheduling Time Budget has been exceed, the task may be returned to the operator, or it may be returned to the queue router 102 for attempted rescheduling. If there are more tasks for partitioning 302 and scheduling 304 decision 310, the system will return to the state of receiving new tasks, block 400.

By separating the overall scheduling task into a series of homogeneous problem sets of a manageable size, scheduling system 100 advantageously increases the efficiency of scheduling all tasks. Indeed, scheduling system 100 is adaptable for a wide range of scheduling tasks and therefore enjoys continued opportunity for reuse and re-application, advantageously permitting faster and more reliable scheduling of future tasks sets and cost savings in re-developing new specialized scheduling methodologies.

The ability to permit multiple concurrent scheduling algorithms to be performed also advantageously increases efficiency as specific schedulers may be employed for the data types and characteristics for which they are best suited. Moreover, multiple schedulers can work in parallel on different sub-problem portions of the overall scheduling problem to provide partial schedule updates, which in aggregate improve overall scheduling system 100 throughout.

It should be understood and appreciated that multiple instantiations of the scheduling system 100 elements are operable concurrently. Indeed, in at least one embodiment, scheduling system 100 will perform partitioning operations on new tasks while previously partitioned and queued tasks are being received by one or more schedule managers 110 and directed to one or more schedulers 112. Further, as performed in a computer environment, the method of the scheduling system 100 may be rendered in a variety of different forms of code and instructions as may be preferred for different computer systems and environments.

Moreover, with respect to the above description and accompanying figures, at least one embodiment of scheduling system 100 is appreciated to advantageously decompose a scheduling problem into sub-problems for simplicity, runtime performance considerations, and to enable the use of the best algorithmic methodology for the problem(s) or sub-problem(s) at hand.

Figure 6:
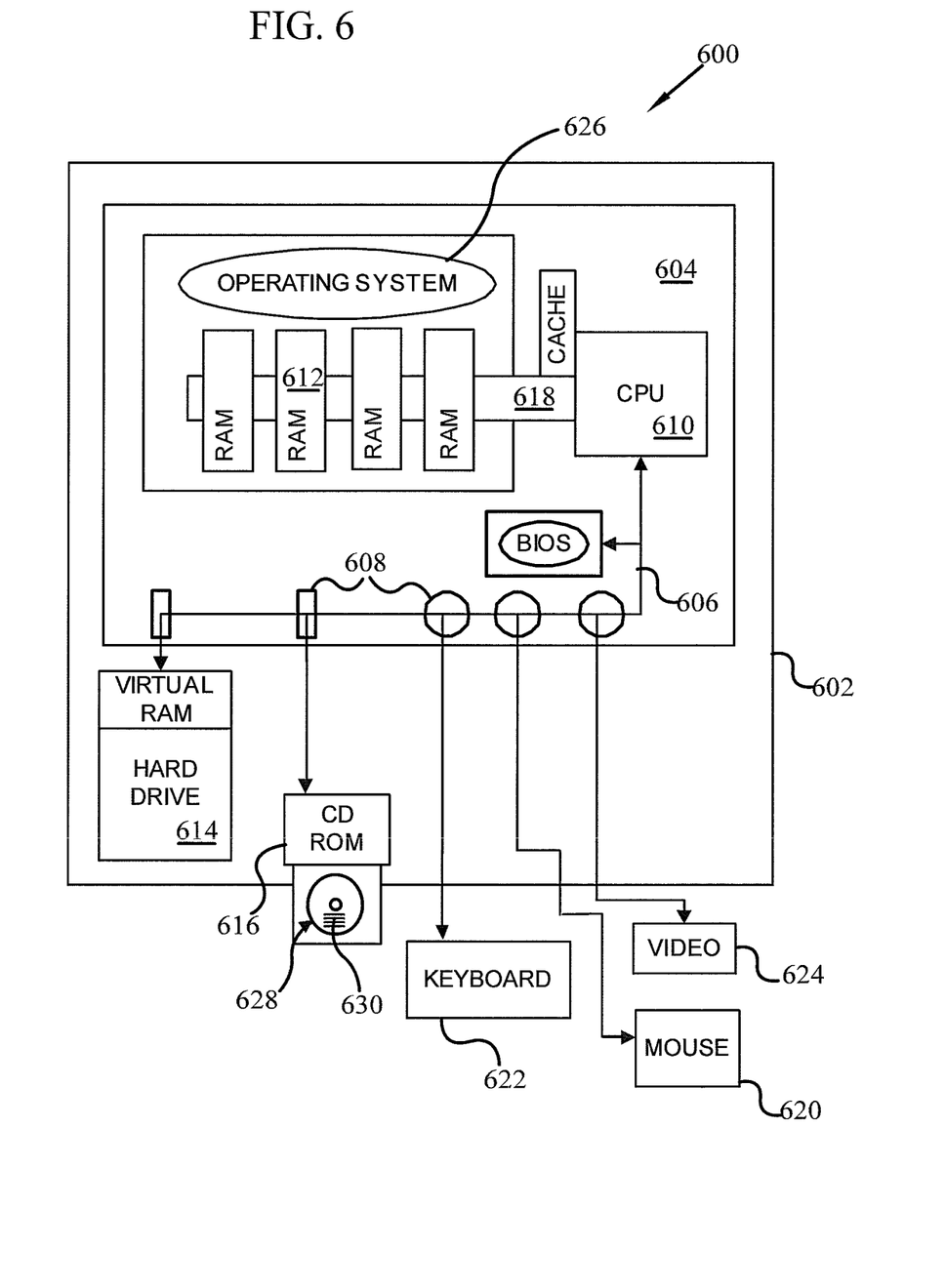
FIG. 6 is a block diagram of a computer system in accordance with one or more embodiments.

In at least one embodiment, the scheduling system 100 is implemented as a computer system for scheduling activities. FIG. 6 is a high level block diagram of an exemplary computer system 600. Computer system 600 has a case 602, enclosing a main board 604. The main board has a system bus 606, connection ports 608, a processing unit, such as Central Processing Unit (CPU) 610, and a memory storage device, such as main memory 612, hard drive 614, and CD/DVD Rom drive 616.

Memory bus 618 couples main memory 612 to CPU 610. A system bus 606 couples hard drive 614, CD/DVD Rom drive 616, and connection ports 608 to CPU 610. Multiple input devices may be provided, such as for example a mouse 620 and keyboard 622. Multiple output devices may also be provided, such as for example a video monitor 624 and a printer (not shown).

Computer system 600 may be a commercially available system, such as a desktop workstation unit provided by IBM, Dell Computers, Gateway, Apple, Sun Micro Systems, or other computer system provider. Computer system 600 may also be a networked computer system, wherein memory storage components such as hard drive 614, additional CPUs 610 and output devices such as printers are provided by physically separate computer systems commonly tied together in the network. Those skilled in the art will understand and appreciate that physical composition of components and component interconnections comprising computer system 600, and select a computer system 600 suitable for the schedules to be established and maintained.

When computer system 600 is activated, preferably an operating system 626 will load into main memory 612 as part of the boot strap startup sequence and ready the computer system 600 for operation. At the simplest level, and in the most general sense, the tasks of an operating system fall into specific categories—process management, device management (including application and user interface management) and memory management.

In such a computer system 600, the CPU 610 is operable to perform one or more of the scheduling embodiments described above. Those skilled in the art will understand that a computer-readable medium 628 on which is a computer program 630 for adding activities to a schedule may be provided to the computer system 600. The form of the medium 628 and language of the program 630 are understood to be appropriate for computer system 600. Utilizing the memory stores, such as for example one or more hard drives 614 and main system memory 612, the operable CPU 602 will read the instructions provided by the computer program 630 and operate to perform the scheduling system 100 as described above Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A task scheduling method, comprising:
   partitioning tasks provided for scheduling, the partitioning including
      receiving at least one task including at least one type of data for schedulable tasks from users, wherein the at least one type of data includes a preferred task implementation time or a geographic location associated with a corresponding task of the tasks;
      formatting the task data in a compliant form for schedulers,
      reviewing the task data to determine a user-configurable scheduling criteria of at least one data element in the task data, and
      routing the task to a queue of a plurality of queues, each queue having a characteristic, based on the determined user-configurable scheduling criteria being consistent with the characteristic of the queue, wherein the characteristic of each queue includes a task implementation time and a task geographic location; and
   scheduling the partitioned tasks, the scheduling including
      retrieving the at least one task from the queue in response to a trigger,
      determining the characteristics of the queues and characteristics of the schedulers, wherein the schedulers include a first scheduler configured to implement a first scheduling algorithm and a second scheduler configured to implement a second scheduling algorithm different from the first scheduling algorithm, the characteristics of the schedulers including speed and precision of scheduling performance of a respective scheduling algorithm implemented by the scheduler, and
      routing the at least one task to the first scheduler based upon the queue characteristic being consistent with the, scheduler characteristic of the first scheduler.

2. The scheduling method of claim 1, wherein the trigger is selected from a group consisting of the passage of time, exceeding a threshold of tasks within the queue, a flag attached to the task and combinations thereof.

3. The scheduling method of claim 1, wherein the partitioning is performed by at least one task manager, at least one queue router and at least one queue; the scheduling performed by at least one schedule manager and at least one scheduler.

4. The scheduling method of claim 3, wherein multiple instantiations of task managers, queue routers, queues, schedule managers and schedulers are operable concurrently.

5. The scheduling method of claim 1, wherein partitioned tasks are scheduled in parallel.

6. The scheduling method of claim 1, wherein the method is stored on a computer-readable medium as a computer program which, when executed by a computer will perform the steps of scheduling tasks.

7. The scheduling method of claim 1, wherein the scheduler is selected from the group consisting of an off-the-shelf solver, randomized algorithms, genetic algorithms, hybrid dynamic programming, English Auction, greedy impact, squeaky wheel optimization, ant colony, simulated annealing, and combinations thereof.

8. A task scheduling system for conserving one or more resources comprising:
   a plurality of schedulers for scheduling utilization of the one or more resources, each scheduler having at least one characteristic, wherein the schedulers include a first scheduler configured to implement a first scheduling algorithm and a second scheduler configured to implement a second scheduling algorithm different from the first scheduling algorithm the characteristic of a respective scheduler including speed and precision of scheduling performance of a respective scheduling algorithm implemented by the scheduler;

a task manager operable to accept task data for schedulable tasks from users, the task manager being configured to format the task data in a compliant form for the schedulers, wherein the task data includes a preferred task implementation time or a geographic location associated with a corresponding task of the tasks;

a queue router operable to receive the tasks from the task manager, the queue router reviewing the task data to determine a user-configurable scheduling criteria of at least one data element in the task data;

a plurality of queues, each queue having a characteristic and operable to receive a task of the tasks from the queue router, wherein the characteristic of each queue includes a task implementation time and a task geographic location, the queue router being configured to route the task to a respective queue based upon the determined user-configurable scheduling criteria being consistent with the characteristic of the queue;

a schedule manager operable to determine the characteristics of the queues and characteristics of the schedulers, receive the task from one of the queues and provide the task to one of the schedulers based on the characteristic of the queue being consistent with the characteristic of the scheduler; and a trigger operable to trigger the schedule manager to retrieve the task from the queue.

9. The scheduling system of claim 8, wherein the trigger is operable in response to an event selected from the group of passage of time, exceeding a threshold of tasks within the queue, a flag attached to the task and combinations thereof.

10. The scheduling system of claim 8, wherein the queue router is further operable to receive a task from the schedule manager, the task having failed to schedule.

11. The scheduling system of claim 8, wherein multiple instantiations of queues, schedule managers and schedulers are operable concurrently.

12. The scheduling system of claim 8, wherein multiple schedulers are operable in parallel.

13. The scheduling system of claim 8, wherein routing the task to a queue includes routing the task to at least one additional router.

14. The scheduling system of claim 8, further including a resource manager operable to maintain the state of resources over time, the resources including elements necessary for the task and elements of the scheduling system available for the scheduling of the task.

15. The scheduling system of claim 8, wherein the system is operable to perform scheduling as a two task process to homogenize the tasks scheduled by a respective scheduler;

task one including partitioning provided tasks for scheduling, the partitioning including;
 receiving at least one task including at least one type of data;
 reviewing the data to determine at least one scheduling criteria;
 routing the task to a queue based on the determined scheduling criteria, the queue having at least one queue characteristic; and task two including scheduling the partitioned tasks, the scheduling including;
 retrieving the at least one task from the queue in response to a trigger; and
 routing the at least one task to a scheduler, the scheduler routing being based in a first instance upon the at least one queue characteristic, and in a second instance upon the at least one scheduler characteristic.

16. The scheduling system of claim 15, wherein for a provided set of related tasks, multiple partitioning tasks and scheduling tasks are performed in parallel for at least a subset of the related tasks.

17. A non-transitory computer-readable medium on which is stored a computer program for scheduling tasks, the computer program comprising instructions which, when executed by a computer, perform the steps of:

partitioning tasks provided for scheduling, the partitioning including
 receiving at least one task including at least one type of data for scheduling tasks from users, wherein the at least one type of data includes a preferred task implementation time or a geographic location associated with a corresponding task of the tasks;
 formatting the task data in a compliant form for schedulers,
 reviewing the task data to determine a user-configurable scheduling criteria of at least one data element in the task data, and
 routing the task to a queue of a plurality of queues, each queue having a characteristic, based on the determined user-configurable scheduling criteria being consistent with the characteristic of the queue, wherein the characteristic of each queue includes a task implementation time and a task geographic location; and scheduling the partitioned tasks, the scheduling including
 retrieving the at least one task from the queue in response to a trigger,
 determining the characteristics of the queues and characteristics of the schedulers, wherein the schedulers include a first scheduler configured to implement a first scheduling algorithm and a second scheduler configured to implement a second scheduling algorithm different from the first scheduling algorithm, the characteristics of the schedulers including speed and precision of scheduling performance of a respective scheduling algorithm implemented by the scheduler, and
 routing the at least one task to the first scheduler based upon the queue characteristic being consistent with the, scheduler characteristic of the first scheduler.

18. The computer-readable medium of claim 17, wherein for a provided set of related tasks, multiple partitioning tasks and scheduling tasks are performed in parallel for at least a subset of the related tasks.

19. The computer-readable medium of claim 17, wherein the trigger is selected from a group consisting of the passage of time, exceeding a threshold of tasks within the queue, a flag attached to the task and combinations thereof.

20. The computer-readable medium of claim 17, wherein the partitioning is performed by at least one task manager, at least one queue router and at least one queue; the scheduling performed by at least one schedule manager and at least one scheduler.

21. The computer-readable medium of claim 17, wherein multiple instantiations of task managers, queue routers, queues, schedule managers and schedulers are operable concurrently.

22. A computer system for scheduling activities comprising:
- a processing unit;
- a memory storage device coupled to the processing unit;
- an input device coupled to the processing unit; and
- an output device coupled to the processing unit;
- the processing unit being operative to:
  - partition tasks provided for scheduling, the partitioning including
    - receive at least one task including at least one type of data for schedulable tasks
      - from users, wherein the at least one type of data includes a preferred task implementation time or a geographic location associated with a corresponding task of the tasks;
    - format the task data in a compliant form for schedulers,
    - review the task data to determine a user-configurable scheduling criteria of at least one data element in the task data, and
    - route the task to a queue of a plurality of queues, each queue having a characteristic, based on the determined user-configurable scheduling criteria being consistent with the characteristic of the queue, wherein the characteristic of each queue includes a task implementation time and a task geographic location; and
  - schedule the partitioned tasks, the scheduling including
    - retrieve the at least one task from the queue in response to a trigger,
    - determine the characteristics of the queues and characteristics of the schedulers, wherein the schedulers include a first scheduler configured to implement a first scheduling algorithm and a second scheduler configured to implement a second scheduling algorithm different from the first scheduling algorithm, the characteristics of the schedulers including speed and precision of scheduling performance of a respective scheduling algorithm implemented by the scheduler, and
    - route the at least one task to the first scheduler based upon the queue characteristic being consistent with the, scheduler characteristic of the first scheduler.

23. The computer system of claim 22, wherein for a provided set of related tasks, multiple partitioning tasks and scheduling tasks are performed in parallel for at least a subset of the related tasks.

24. The computer system of claim 22, wherein multiple instantiations of task managers, queue routers, queues, schedule managers and schedulers are operable concurrently.

25. The computer system of claim 22, wherein the partitioning is performed by at least one task manager, at least one queue router and at least one queue; the scheduling performed by at least one schedule manager and at least one scheduler.

* * * * *

UNITED STATES PATENT AND TRADEMARK OFFICE
CERTIFICATE OF CORRECTION

PATENT NO. : 8,893,130 B2  
APPLICATION NO. : 11/691361  
DATED : November 18, 2014  
INVENTOR(S) : Smith et al.

Page 1 of 1

It is certified that error appears in the above-identified patent and that said Letters Patent is hereby corrected as shown below:

Specification

In column 4, line 51, after "the", insert --system and translate the received task into an object and/or format that is compliant with the--, therefor In column 6, line 11, after "least", insert --one scheduler 112.--, therefor In column 7, line 20, delete "scheduler's" and insert --schedulers--, therefor

In column 7, line 25, delete "scheduler's" and insert --schedulers--, therefor In column 8, line 14, delete "resource" and insert --vehicle--, therefor In column 8, line 18, after "must", insert --be moved in order to collect the images.--, therefor In column 9, line 44, after "the", insert --schedule. The process cycles back to step one, where a reordering is performed based on the--, therefor Signed and Sealed this  
Thirty-first Day of May, 2016

Michelle K. Lee  
*Director of the United States Patent and Trademark Office*